(12) United States Patent
Villani et al.

(10) Patent No.: US 6,288,670 B1
(45) Date of Patent: Sep. 11, 2001

(54) COMBINED ROLL-YAW SPACECRAFT STEERING METHOD FOR LOW EARTH ORBIT TARGET TRAJECTORY COMPENSATION

(75) Inventors: Daniel D. Villani, Long Beach, CA (US); Harold A. Rosen, Santa Monica, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/470,701

(22) Filed: Dec. 23, 1999

(51) Int. Cl.[7] .................................................. H04B 7/185
(52) U.S. Cl. ............................................................ 342/354
(58) Field of Search ....................... 342/354; 244/158 R, 244/164, 171; 455/12.1, 13.1, 13.2, 13.3; 701/13

(56) References Cited

U.S. PATENT DOCUMENTS 6,154,692 * 11/2000 Cielaszyk et al. .................... 701/13

* cited by examiner

Primary Examiner—Gregory C. Issing
Assistant Examiner—Fred H Mull
(74) Attorney, Agent, or Firm—T. Gudmestad (57) ABSTRACT

For an antenna on a satellite in an inclined orbit about the Earth, cross-track motion resulting from the rotation of the Earth can be reduced in antenna coordinates by yawing and/or rolling the antenna (preferably by yawing and/or rolling the entire satellite, for example, by using a reaction wheel system) by an appropriate angle, which varies throughout the orbit.

14 Claims, 7 Drawing Sheets

COMBINED ROLL-YAW SPACECRAFT STEERING METHOD FOR LOW EARTH ORBIT TARGET TRAJECTORY COMPENSATION

BACKGROUND OF THE INVENTION (a) Field of the Invention

The present invention relates generally to a method for steering a satellite antenna beam or array of beams, and more particularly, to a method for simplifying the steering of an antenna beam or array of beams on a satellite in an inclined earth orbit in order to compensate for cross-track motion of earth-based terminals that is caused by rotation of the Earth.

(b) Description of Related Art

Antenna systems for communication satellites that are in non-geostationary orbits may require continuous adjustment of beam steering directions relative to the satellite to maintain coverage of users located within an earth-fixed cell during the pass of the satellite over the cell. The direction from the satellite to the users in satellite coordinates is affected by the rotation of the Earth as well as by the orbital motion of the satellite. The surface speed of the Earth due to rotation is proportional to the cosine of the latitude of the satellite, which varies throughout the orbit for all but equatorial (zero-inclination) orbits. This variation of relative velocity as a function of latitude normally requires beam steering in the cross-track direction (i.e., orthogonal to the velocity vector of the satellite) as well as in the along-track direction (i.e., along the velocity vector of the satellite), which in turn results in excessively complicated and cumbersome beam steering systems.

LEO satellite systems have the disadvantage that the satellite is in motion relative to the stationary or slowly moving user on or near the earth's surface. Users are usually grouped into cells depending on the user's geographic location. In the communications system, each cell is associated with a satellite antenna beam that transmits signals to or receives signals from the users located in a particular cell.

In prior art satellite systems, the cell-beam relationship can be described as either earth-fixed cells or satellite-fixed beams. In satellite-fixed beam systems, the beams point in fixed directions relative to the satellite body and thus sweep over the cells as the satellite moves through its orbit. As a result, the users must be reassigned to different beams frequently. There must be rapid reassignment calculations and frequent messages exchanged between the satellite and the user to coordinate the reassignment, leading to a significant overhead load being used for control (i.e., messages instead of for voice, data, video, etc.) on the system.

In earth-fixed cell systems, the satellite must continuously repoint the antenna beams to follow the motion of the cells as seen from the moving satellite. Implementing earth-fixed cells requires a very complex antenna that can steer many beams in two angular dimensions. Rapid reassignment calculations and overhead load are reduced at the expense of a vastly more complex antenna.

If the satellite antenna system is an electronically steered, high gain, low side lobe multibeam array, antenna steering may involve the control of the phase and amplitude of many elements. The number of active control elements required is substantially increased when beam steering is required in the cross-track direction as well as the along-track direction. This is normally the case, since for an antenna array aligned with the satellite geometric axes, cross-track motion results from the rotation of the Earth.

SUMMARY OF THE INVENTION

By using a combined roll-yaw steering method for the satellite, cross-track beam steering can be avoided, thereby greatly simplifying the antenna beam control steering system. In accordance with the present invention, cross-track motion of ground targets resulting from the rotation of the Earth can be dramatically reduced in antenna coordinates by rolling and/or yawing the antenna by an appropriate angle, which varies throughout the orbit. Preferably, the entire satellite is rolled and/or yawed, for example, by using a reaction wheel system. The roll-yaw steering method in accordance with the present invention results in a considerable simplification of the antenna beam steering system.

In accordance with one aspect of the present invention, a method is provided for steering a satellite antenna mounted to a satellite. The satellite has a pitch axis, a roll axis, and a yaw axis and travels in an orbit around a rotating object. The orbit has an inclination and an ascending node. The method comprises the steps of: determining a curvature of trajectories induced by the antenna; determining an angular distance of the satellite from the ascending node; determining an inclination of the orbit; determining a time in the orbit from the ascending node; determining a period of the orbit; determining the period of the rotation of the object; steering the antenna about the roll axis by a first angle, wherein the first angle is a function of the curvature of trajectories induced by the antenna and the angular distance of the satellite from the ascending node; and steering the antenna about the yaw axis by a second angle, wherein the second angle is a function of the inclination of the orbit, the time in the orbit from the ascending node, the period of the orbit, and the period of the rotation of the object.

In one embodiment, the steering step includes a step of calculating the first angle using the formula R=Croll*sin(U), where Croll is a constant which depends on the curvature of trajectories induced by the antenna and U is the angular distance of the satellite from the ascending node.

In some embodiments, the steering step includes a step of calculating the first angle using the formula φ= arctan [[sin(i)cos(2πt/P)]/[(D/P)-cos(i)]], where i is the inclination of the orbit, t is the time in the orbit from the ascending node, P is the period of the orbit, and D is the period of the rotation of the object.

BRIEF DESCRIPTION OF THE DRAWING

These and other features and advantages of the present invention will become more apparent from a detailed consideration of the following detailed description of certain preferred embodiments when taken in conjunction with the drawings in which.

DESCRIPTION OF THE PREFERRED EMBODIMENT

Although the following description focuses on low earth orbit communications satellites, persons of ordinary skill in the art will readily appreciate that the techniques of the present invention are in no way limited to low earth orbit communication satellites. On the contrary, any communication system which might benefit from simplified variations of cross-track motion of targets allowing an antenna or sensor to track objects on the ground with arrays of cells or pixels in a pattern which is independent of the orbit of the satellite, may benefit from the teachings herein.

The system uses roll-yaw steering to superimpose curvature differences in the satellite ground track over curvature differences in the antenna coordinate system, causing them to cancel each other. As a result, repeatability of target trajectories over the entire orbit and minimization of required sensor and/or antenna system complexity is achieved.

Figure 1:
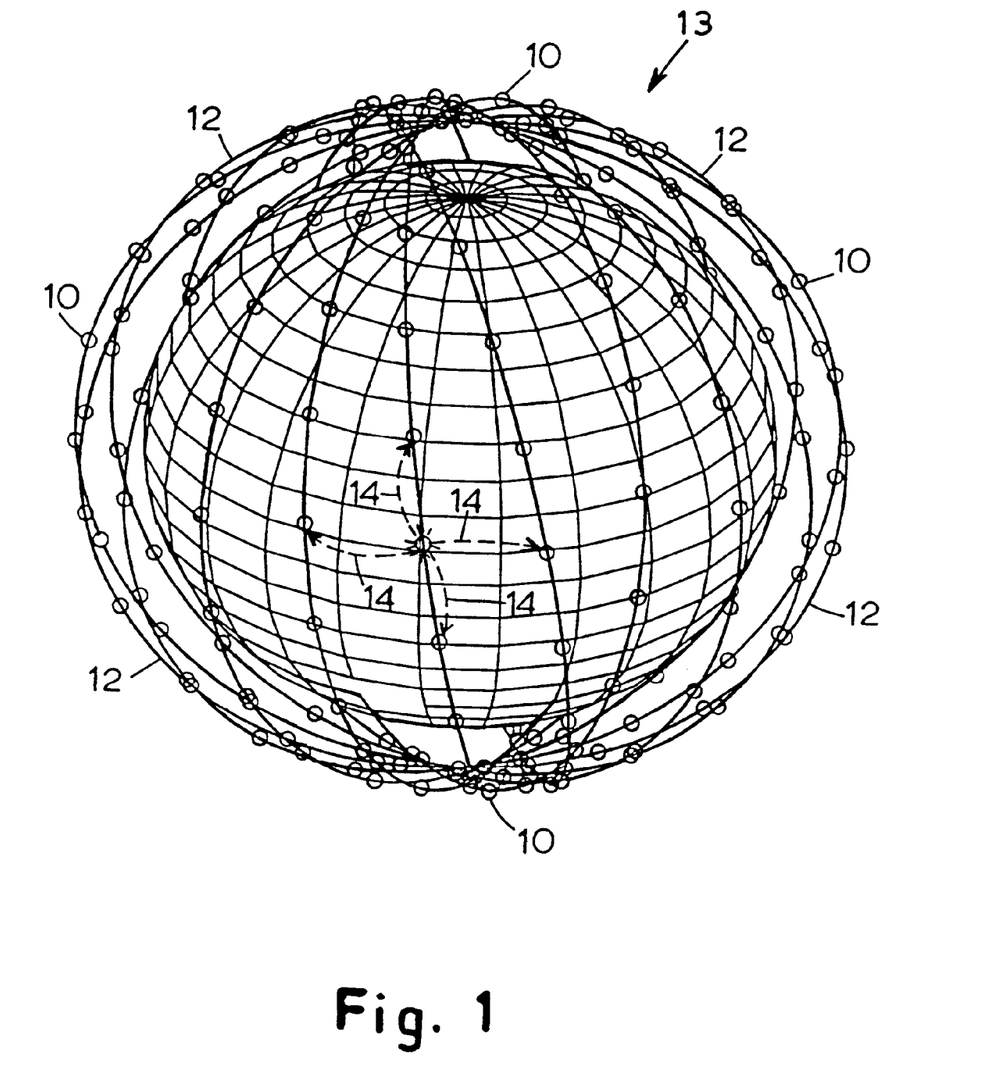
FIG. 1 illustrates a non-geostationary satellite communications system comprising a plurality of satellites in earth orbit.

A non-geostationary satellite communications system, comprising a plurality of satellites 10 located in earth orbit is illustrated in FIG. 1. This example constellation is in low-earth orbit at 1400 km altitude, has ten orbit planes 12 spaced at 18.5 degrees separation of ascending nodes, and is inclined 82 degrees from the equator into nearly polar orbits. There are twenty satellites 10 per plane 12.

Figure 2A:
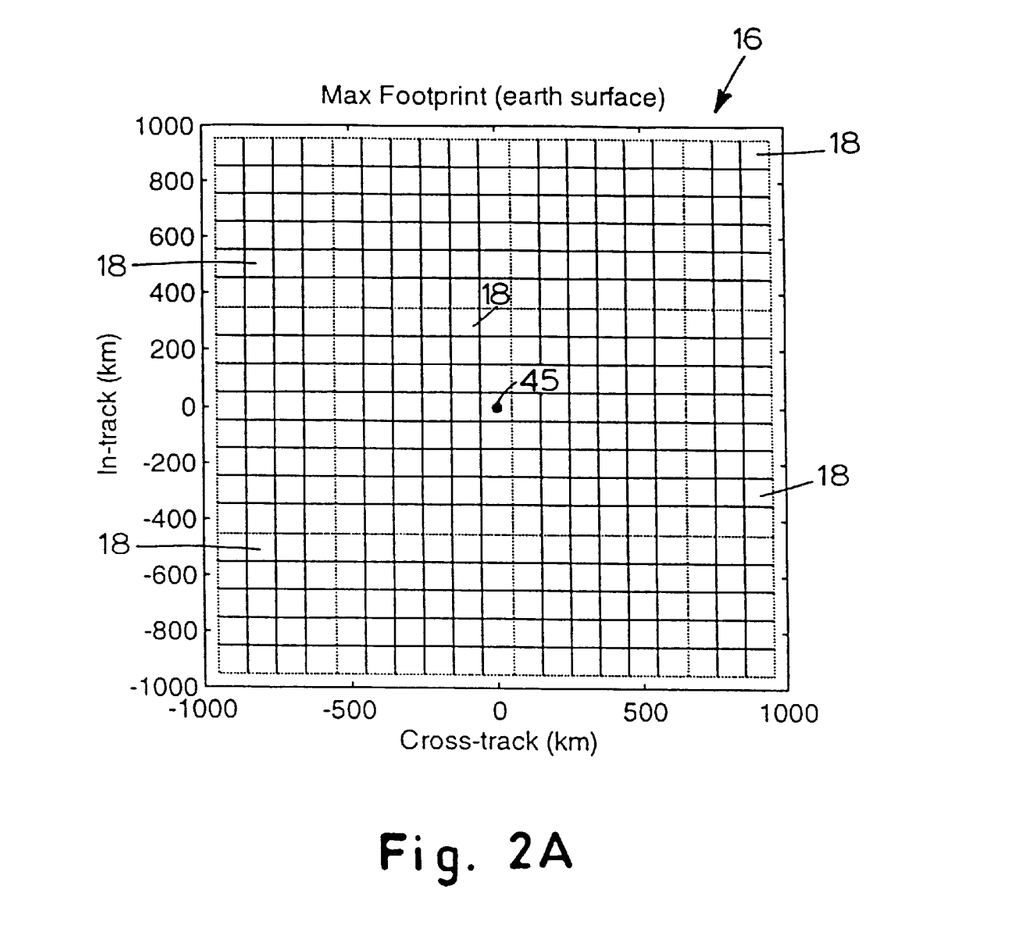
FIG. 2A is a grid illustrating a satellite footprint on the surface of the earth in kilometers.
Figure 2B:
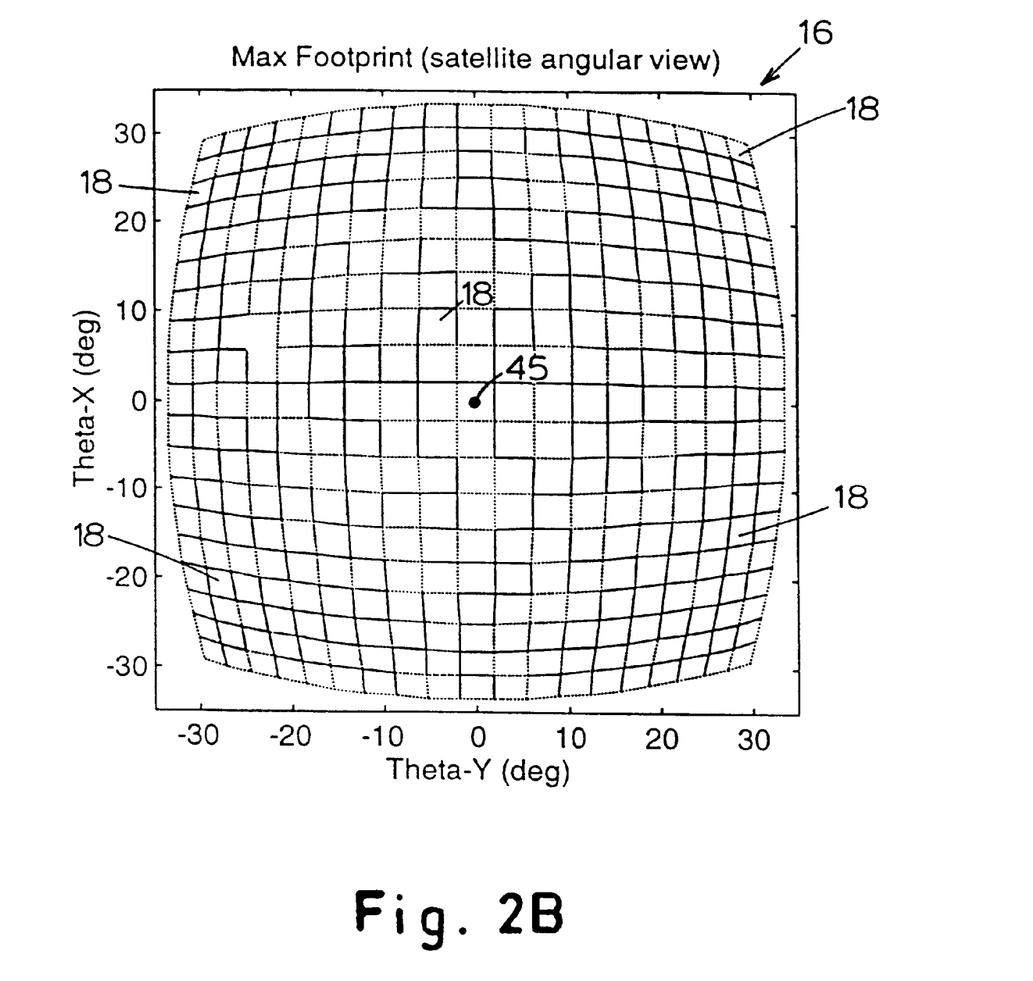
FIG. 2B is a grid illustrating a satellite footprint on the surface of the earth in satellite angular coordinates.

A satellite footprint 16 on the surface of the earth in kilometers is illustrated in FIG. 2A and in satellite angular coordinates in FIG. 2B. In the preferred embodiment, the maximum satellite footprint 16 is approximately eighteen by eighteen degrees square in earth-central angle centered at the sub-satellite point 45 shown in FIGS. 2A and 2B. The footprint 16 is divided into approximately equal surface area cells 18, which are aligned in columns in the in-track direction (i.e., the direction the satellite is traveling). The columns are curved in angle space to match the transformation from linear cell columns on the earth 13. The curvature of columns in angle space is implemented in an uplink antenna 20 (see FIG. 3). Square cells 18 are shown. However, a person of ordinary skill in the art will readily appreciate that other arrangements, such as hexagonal cells, are well within the scope of the present invention.

Figure 3:
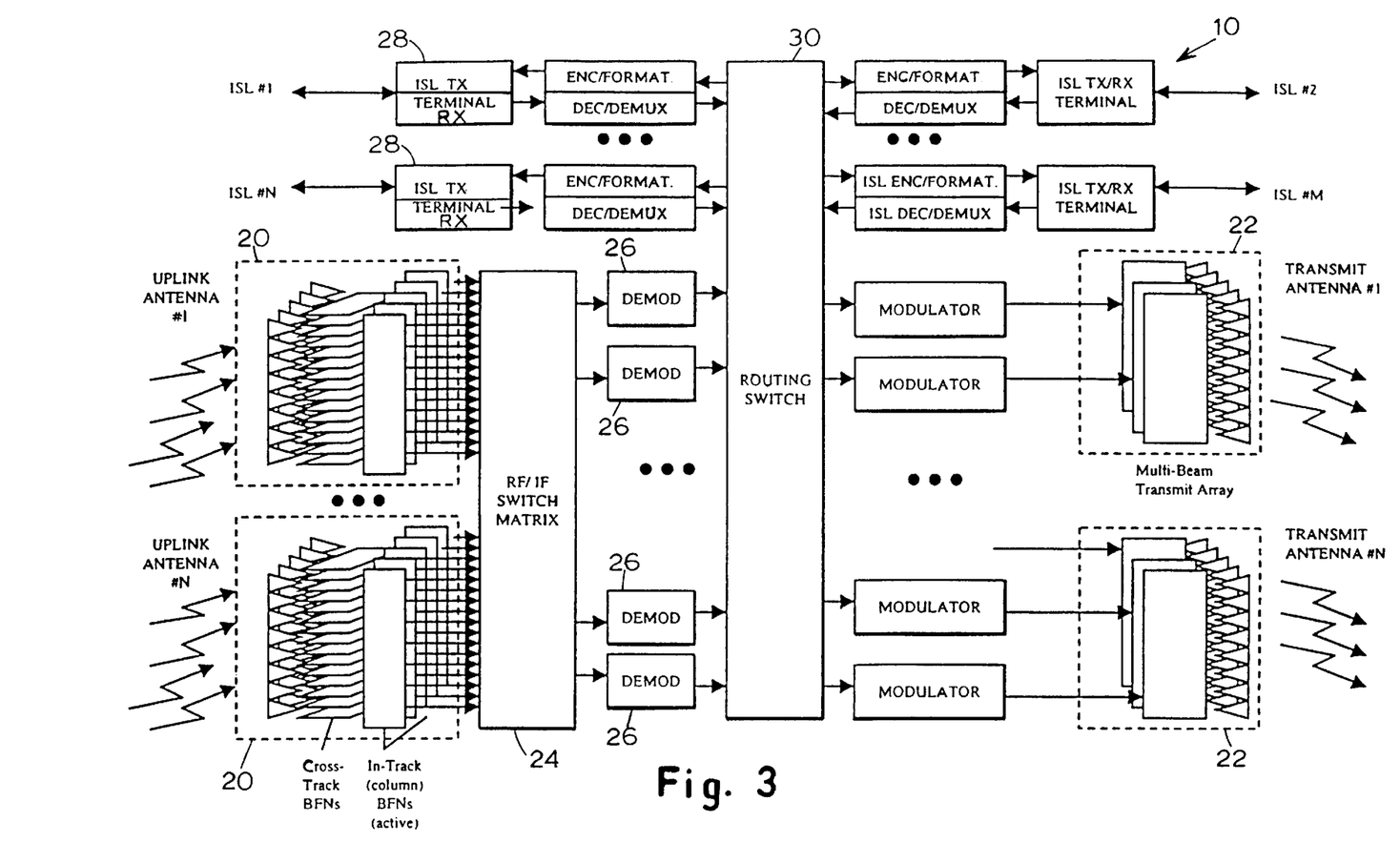
FIG. 3 is a block diagram illustrating a satellite, suitable for use as a satellite depicted in FIG. 1.

A satellite 10, suitable for use as the satellite 10 depicted in FIG. 1, is illustrated in FIG. 3. Preferably each satellite 10 employs a communications payload comprising: an active beamforming uplink antenna system 20 using linear cell tracking; one or more phased-array downlink antennas 22 generating multiple independently steerable downlink beams steered in conjunction with time division multiple-access (TDMA) downlink formatting; a radio frequency (RF) switch matrix 24 interconnecting uplink beams to demodulators 26; one or more intersatellite links 28 preferably interconnecting adjacent satellites 10; and an on-board routing switch 30 for routing data packets between the uplink antennas 20, downlink antennas 22, and intersatellite links 28. Preferably, the system operates within a fixed frequency band allocation on uplink and downlink. The satellites 10 provide a regenerative repeater and autonomous routing function which demodulates and routes data packets based on destination addressing within the packet format.

Each adaptive beamforming uplink antenna 20 is an antenna using commandable amplitude/phase weights to form the beam shapes and scanning positions over time. Each phased-array downlink antenna 22 is an antenna implemented as a planar array whit per-element steering controls. Of course, any antenna providing a plurality of beams, each of which is independently steerable, can be utilized.

The RF switch matrix 24 is an interconnect matrix of RF input signals to RF output signals, wherein an input signal can be attached to one or more output ports. The RF switch matrix 24 allows variable numbers of uplink resources (channels/timeslots) to be connected to the uplink antenna 20 beam ports. The RF switch matrix 24 can be commanded in response to both traffic demand changes and satellite 10 motion ("ratcheting").

Each satellite 10 in the constellation employs a roll-yaw steering program to compensate for earth rotation and linearize the track of the ground cells 18 as viewed in satellite 10 angular space (i.e., compensate for the cross-track angular motion of earth users). Roll-yaw steering involves adjusting the attitude (or orientation) of the satellite 10 body along its yaw and/or roll axes. Roll-yaw steering compensates for the relative motion of points on the earth 13 in the cross-track angular direction by rotating the satellite 10 to a predefined angle. The angle is a function of the satellite 10 location in its orbit. When the satellite 10 is steered in this manner, the angular track of a ground point will follow a fixed trajectory through angle space. All ground points which enter the footprint 16 of the satellite 10 at the same relative location from the sub-satellite point 45 will follow this trajectory. "Points on the surface of the earth" include points fixed with respect to the surface of the earth 13, such as towers, and points moving with respect to the earth's surface but much slower than the satellite 10, such as cars, boats, airplanes, or clouds. These points are referred to as "targets". A person of ordinary skill in the art will readily appreciate that the scope of the present invention includes targets on planets other than the earth 13. "Passing beneath the satellite" refers to any relative motion of the satellite 10 and the target which brings the target into and then out of the region of interest of the satellite 10, regardless of whether the target passes near the sub-satellite point 45. "Antenna" is intended to mean an antenna, a sensor, or any other system which views the objects over which the satellite 10 passes.

Figures 4, 6:
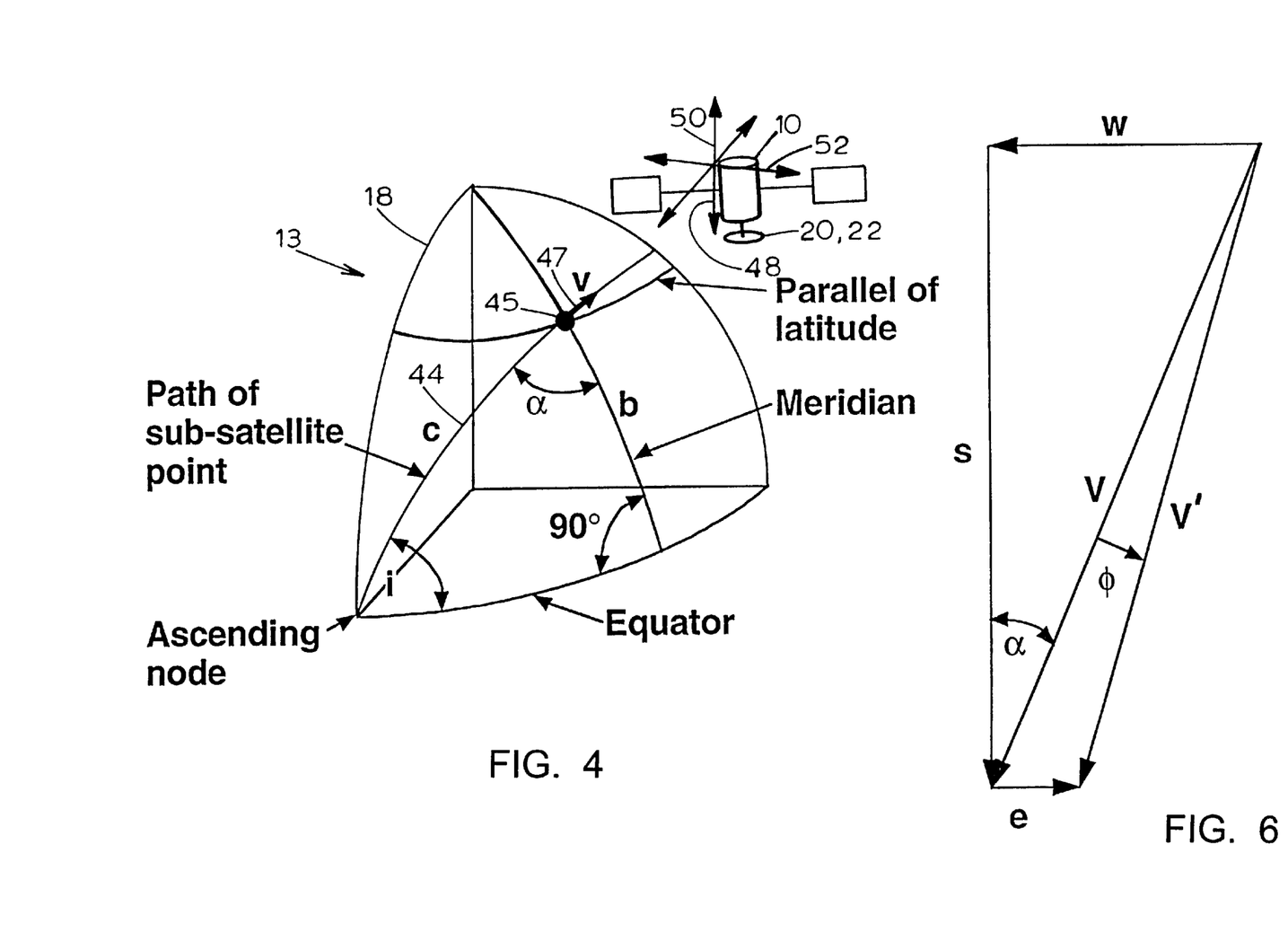
FIG. 4 is a schematic view of an the exemplary satellite of FIG. 3 capable of being used for carrying out the method of the present invention, and the ground track of the satellite on a quadrant of the Earth.
FIG. 6 is a schematic vectorial representation of the velocity of an earth-based terminal in a satellite-based frame of reference.

FIG. 4 schematically shows a satellite 10 in an inclined, circular low-earth orbit over a quadrant 18 of the northern hemisphere of the Earth 13. A curve in FIG. 4 designated 44, represents the path of a sub-satellite point 45 (i.e., a point on the surface of the Earth 13 directly below the satellite 10), as the sub-satellite point 45 travels across the quadrant 12 of the Earth 13. The sub-satellite point 45 travels at a velocity v in a direction indicated by an arrow 47. An antenna 20, 22 is mounted to the satellite 10. A satellite-fixed coordinate system is depicted in FIG. 4 as follows: a yaw axis 48, a roll axis 50, and a pitch axis 52.

Figure 5:
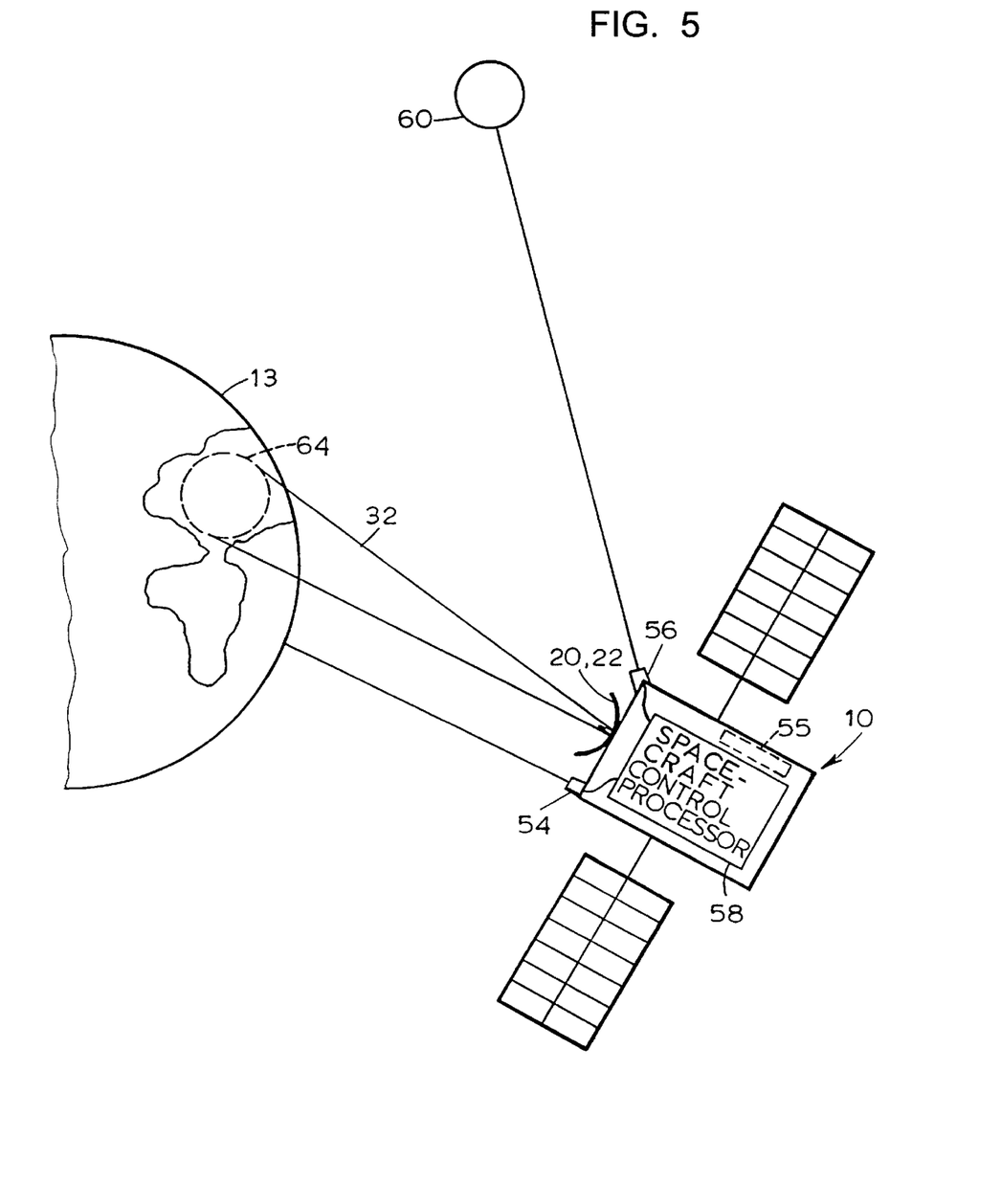
FIG. 5 is a more detailed schematic diagram of the satellite shown in FIG. 1, further illustrating an apparatus for carrying out the method of the present invention.

Referring now to FIG. 5, the satellite 10 in which the present invention may be implemented is shown in further detail. In addition to the antenna 20, 22, the satellite 10 further includes an earth sensor 54, a reaction wheel system 55, a sun sensor 56, and a spacecraft control processor 58. The earth sensor 54 and the sun sensor 56 sense the attitude of the satellite 10 with respect to the Earth 13 and the Sun 60. The antenna 20, 22 projects an electromagnetic beam 32 onto a coverage area 64 on the Earth 13.

The earth sensor 54 and the sun sensor 56 are only two examples of attitude sensors, and other types of attitude sensors may be used in attitude determination systems. Alternatively, attitude sensors may use beacons, constellations, or other heavenly bodies as reference objects. Output signals from the attitude sensors 54, 56 are fed to the spacecraft control processor 58, which is responsible for attitude determination and adjustment.

Command signals from the spacecraft control processor 58 are sent to the reaction wheel system 55 to adjust the attitude of the satellite 10. The reaction wheel system 55 is only one example of a device that can be used to adjust the attitude of the satellite 10. Alternatively, other devices, such as, for example, chemical or electrical thrusters could be used to adjust the attitude of the satellite 10 in response to commands from the spacecraft control processor 28.

The earth is moving sideways relative to the path of the spacecraft motion in inertial space, and so to make the ground targets appear to move directly up and down in the satellite frame of reference, the satellite has to yaw. This is similar to the "crab angle" that an airplane has to use when making a landing in a crosswind. The geometry depends only on the relative velocity of the spacecraft and the planet rotating below it, so all the terms in the equation can be determined a priori based on the orbital elements and the size and rotation rate of the planet.

FIG. 6 shows a vectorial derivation of the velocity of an earth-based terminal in a satellite-based frame of reference. The expression for the desired yaw angle is derived as follows. When the satellite 10 is traveling in a northeasterly direction, as illustrated by the arrow 47 in FIG. 4, the orbital motion of the satellite 10 causes a user on the Earth 13 to appear to be moving southwesterly in a frame of reference fixed to the satellite 10. The motion of the Earth 13 due to its rotation adds a relatively small eastward component, giving a clockwise rotation of the resultant motion vector as shown in FIG. 6. As set forth in further detail below, the application of standard trigonometric identities to this construction shown in FIG. 6, results in the expression for the desired roll and yaw angles.

Even though the desired roll-yaw angle is relatively small for low altitude satellites, it necessitates a component of beam steering in a direction perpendicular to the motion of the satellite. If many narrow beams are used to enhance the communication capacity of the satellites, many thousands of electronically controlled adjustments may be required to steer these narrow beams.

Reducing the beam steering complexity by implementing a one-dimensional system of yaw steering according to the present invention can reduce the number of active control elements to a small fraction of those required for a two-dimensional steering case. The implementation of the roll-yaw steering method of the present invention adds no more complexity to the satellite than that of a single active antenna control element, versus thousands of such control elements eliminated by the yaw steering method. Because the frequency of the roll-yaw steering method is so low, one cycle per orbit, the mechanical power associated with the yaw steering method is negligible.

Figure 7:
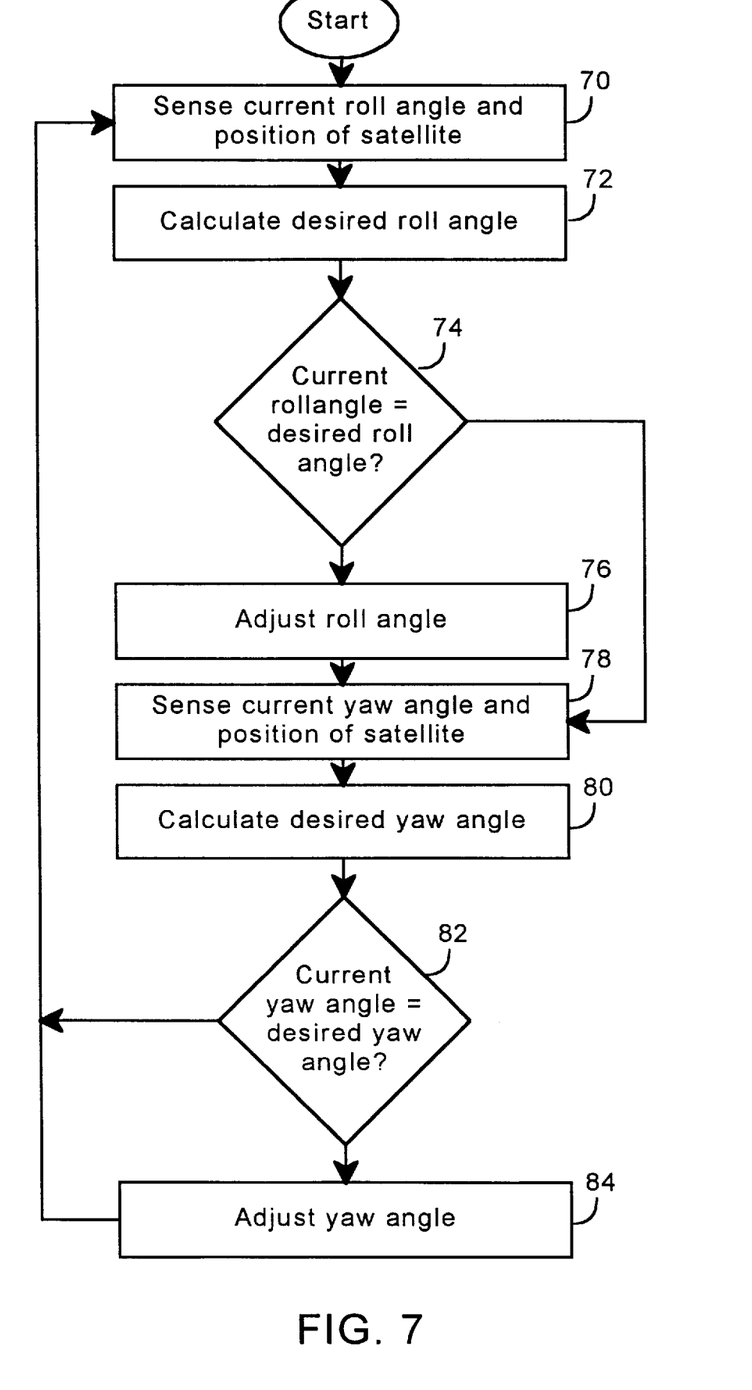
FIG. 7 is a flow diagram illustrating the method of the present invention.

FIG. 7 is a flow diagram illustrating how the method of the present invention can be carried out using the spacecraft control module 58 on the satellite 10. As will be readily understood by those skilled in the art, the method can be carried out using either software or hardware programmed appropriately. First, at block 70, the spacecraft control module 58 determines the position of the satellite 10 and the roll angle of the satellite 10. Next, at block 72, the spacecraft control module 58 calculates the desired roll angle. At block 74, the spacecraft control module 58 then compares the roll angle of the satellite 10 to the desired roll angle. If roll angle adjustment is needed, the spacecraft control module 58 sends an appropriate set of commands to the reaction wheel system 55 in order to adjust the roll angle of the satellite 10 to the desired roll angle (as described in detail below), as indicated at block 76.

If no roll angle adjustment is needed, the spacecraft control module 58 continues at block 78 and where it makes a determination of the position of the satellite 10 and the yaw angle of the satellite 10. Next, at block 80, the spacecraft control module 58 calculates the desired yaw angle (as described in detail below). At block 82, the spacecraft control module 58 then compares the yaw angle of the satellite to the desired yaw angle. If no yaw angle adjustment is needed, the spacecraft control module 58 returns to block 70 and repeats the process. If yaw angle adjustment is needed, the spacecraft control module 58 sends an appropriate set of commands to the reaction wheel system 55 in order to adjust the yaw angle of the satellite 10 to the desired yaw angle as indicated at block 84. The spacecraft control module 58 then returns to block 70 and repeats the determination of the position of the satellite 10 and the roll angle of the satellite 10.

In addition to the earth moving sideways relative to the path of the spacecraft, the earth's surface is also rotating relative to the path of the spacecraft in inertial space. The effect of this rotation is proportional to the component of angular velocity of the surface directed upwards towards the satellite. Since the angular velocity vector of the earth is (by definition) directed along its polar axis, the component of this vector directed upwards towards the satellite is exactly zero when the satellite is crossing the equator, it is positive in the northern hemisphere, reaching a maximum when the satellite reaches the northernmost part of its orbit, and negative in the southern hemisphere. A good approximation is R=Croll*sin(U), where U is the satellite argument of latitude. Sin(U) is zero at the two equator crossings, maximum (positive value) at the northern extreme, and minimum (negative value) at the southern extreme.

The combined roll-yaw steering program described here takes advantage of the fact that the trajectories of targets in antenna coordinates are in general curvilinear. Therefore, they have a second derivative which varies from point to point in the antenna field of view. The desired roll angle offsets the antenna boresight to one side or the other of nadir by the proper amount. Therefore, the change in second derivative induced by the roll is made to closely match the change in second derivative of the trajectories as the satellite moves from equator to pole and back. The desired roll angle is R=Croll*sin(U), where U is the satellite argument of latitude, the angular distance of the satellite from its ascending node and Croll is a constant which depends on the curvature of trajectories induced by a particular antenna geometry.

With reference to FIGS. 4 and 6, the desired yaw angle is derived as follows:

$$\phi = \tan^{-1}\frac{s}{w-e} - \tan^{-1}\frac{s}{w}$$

$$\tan\phi = \frac{se}{s^2 + w^2 - we} = \frac{se}{V^2 - we}$$

$$w = V\sin\alpha$$

$$s = V\cos\alpha$$

-continued $$e = E\cos b$$

$$\cos i = \cos b \sin \alpha$$

$$\cot \alpha = \cos c \tan i$$

$$\tan\phi = \frac{\cos c \sin i}{\frac{V}{E} - \cos i}$$

where:
- i is the orbital inclination angle (FIG. 4);
- c is the orbital arc from the ascending node to the sub-satellite point 15 (FIG. 4);
- b is the latitude of the satellite 10 (FIG. 4);
- α is the angle between the velocity vector of the sub-satellite point 15 and the meridian (FIGS. 4 and 6);
- V is the velocity of the sub-satellite point 15 in the satellite frame of reference (FIGS. 4 and 6);
- s is the south component of V (FIG. 6);
- w is the west component of V (FIG. 6); and
- E is the surface speed of the Earth 13 at the equator (equal to about 1,524 feet per second or about 465 meters per second).

V', shown in FIG. 6, is the velocity of an earth-based terminal in the satellite frame of reference after performing the yaw correction by an angle of φ.

In addition to the trajectory corrections for earth movement described above, a similar correction for satellite roll rate is preferably performed. When the satellite rolls, an additional cross-track motion is associated with the earth-based target.

The yaw program may be modified to account for an effect on the target trajectories which appears as additional cross-track motion due to the roll rate of the satellite. The simplest form of this yaw correction for a circular orbit is Y=Ynoroll+Crollyaw*cos(U), where Ynoroll is the yaw correction described above and Crollyaw is a constant which depends on the roll-yaw coupling effect. So any roll rate of the satellite acts like an additional yaw angle, whose effect may be subtracted from the effect of the yaw angle calculated in the correction described above. The magnitude of the coupling between roll rate and yaw angle depends on several factors, including Croll, dU/dt, and the distance from the satellite to the surface to the planet, but for a circular orbit, all of these factors are constant, so the roll rate impact on the yaw angle is some constant, Crollyaw, times Cos(U). A person of ordinary skill in the art will readily appreciate that for some combinations of sensor geometry and orbital geometry, an analytical expression may be derived for Croll and Crollyaw. For other geometries, it may be more appropriate for a simulation program to be used. The simulation program preferably varies the Croll and Crollyaw terms in combination until the straightest possible trajectories are obtained.

A person of ordinary skill in the art will readily appreciate that although this discussion treats the roll-yaw program as though it is being applied to the entire satellite, the same advantages can be found in moving only the sensor or antenna. The primary advantage is that it regulates trajectory curvature by moving the sensor as a unit, rather than requiring continuous variation of the layout of communication cells in an antenna array, or the pixels in a sensor image plane.

If desired, the antenna 20, 22 could be steered by appropriate actuators mounted to the satellite 10, instead of adjusting the roll-yaw angle of the entire satellite 10. However, and as noted above, because the frequency of the roll-yaw steering method is so low, one cycle per orbit, the mechanical power associated with the roll-yaw steering method is negligible. Accordingly, to minimize the complexity of the satellite 10, it may be preferable to adjust the roll-yaw angle of the entire satellite 10 using the reaction wheel system 25 instead of using an additional mechanism to steer the antenna 20, 22.

In summary, persons of ordinary skill in the art will readily appreciate that an improved satellite communication device and system has been provided. Any satellite system employing the teachings of the present invention may enjoy simplified variations of cross-track motion of targets allowing an antenna or sensor to track objects on the ground with arrays of cells or pixels in a pattern which is independent of the orbit of the satellite.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of steering a satellite antenna mounted to a satellite having a pitch axis, a roll axis, and a yaw axis, the satellite traveling in an orbit around a rotating object, the orbit having an inclination and an ascending node, the method comprising the steps of:
   - determining a curvature of trajectories induced by the antenna;
   - determining an angular distance of the satellite from the ascending node;
   - determining an inclination of the orbit;
   - determining a time in the orbit from the ascending node;
   - determining a period of the orbit;
   - determining a period of the rotation of the object;
   - steering the antenna about the roll axis by a first angle, wherein the first angle is a function of the curvature of trajectories induced by the antenna and the angular distance of the satellite from the ascending node; and
   - steering the antenna about the yaw axis by a second angle, wherein the second angle is a function of the inclination of the orbit, the time in the orbit from the ascending node, the period of the orbit, and the period of the rotation of the object.

2. The method of claim 1 wherein the second angle is modified to account for cross-track motion caused by satellite roll.

3. The method of claim 2 wherein the second angle is modified using the formula Y=Ynoroll+Crollyaw*Cos(U), where Ynoroll is substantially equal to the second angle before modification, Y is the second angle after modification, and Crollyaw is a constant indicative of a roll-yaw coupling effect.

4. The method of claim 1, wherein the step of steering the antenna about the roll axis includes a step of steering the satellite about the roll axis by the first angle.

5. The method of claim 1, wherein the step of steering the antenna about the yaw axis includes a step of steering the satellite about the yaw axis by the second angle.

6. The method of claim 1, wherein the step of steering the antenna about the roll axis includes a step of calculating the first angle using the formula: R=Croll*sin (U), where Croll is a constant which depends on the curvature of trajectories induced by the antenna and U is the angular distance of the satellite from the ascending node.

7. The method of claim 6, wherein the step of steering the antenna about the roll axis includes a step of steering the satellite about the roll axis by the first angle.

8. The method of claim 1, wherein the step of steering the antenna about the yaw axis includes a step of calculating the second angle using the formula: $\phi=\arctan[[\sin(i)\cos(2\pi t/P)]/[(D/P)-\cos(i)]]$, where i is the inclination of the orbit, t is the time in the orbit from the ascending node, P is the period of the orbit, and D is the period of the rotation of the object.

9. The method of claim 8, wherein the step of steering the antenna about the yaw axis includes a step of steering the satellite about the yaw axis by the second angle.

10. The method of claim 1, wherein the rotating object is the Earth.

11. A satellite having a pitch axis, a roll axis, and a yaw axis, the satellite traveling in an orbit around a rotating object, the orbit having an inclination and an ascending node, the satellite comprising:

a satellite antenna mounted to the satellite pointed generally at a target area on the object; and means for reducing pointing errors while steering the satellite antenna by steering the antenna about the roll axis by a first angle and by steering the antenna about a yaw axis by an second angle, wherein the first angle is a function of a curvature of trajectories induced by the antenna and an angular distance of the satellite from the ascending node and the second angle is a function of an inclination of the orbit, a time in the orbit from the ascending node, a period of the orbit, and a period of the rotation of the object.

12. The satellite of claim 11, wherein the means for reducing pointing errors includes means for calculating the first angle using the formula $R=Croll*\sin(U)$, where Croll is a constant which depends on the curvature of trajectories induced by the antenna and U is the angular distance of the satellite from the ascending node and for calculating the second angle using the formula: $\phi=\arctan[[\sin(i)\cos(2\pi t/P)]/[(D/P)-\cos(i)]]$, where i is the inclination of the orbit, t is the time in the orbit from the ascending node, P is the period of the orbit, and D is the period of rotation of the object.

13. The satellite of claim 11, wherein the means for reducing pointing errors includes means for steering the satellite about the roll axis by the first angle.

14. The satellite of claim 11, wherein the means for reducing pointing errors includes means for steering the satellite about the yaw axis by the second angle.

* * * * *